(12) United States Patent
Rao et al.

(10) Patent No.: US 12,524,324 B2
(45) Date of Patent: Jan. 13, 2026

(54) METHODS AND APPARATUS FOR MANAGING DATA IN STACKED DRAMS

(71) Applicant: Advanced Micro Devices, Inc., Santa Clara, CA (US)

(72) Inventors: Karthik Rao, Austin, TX (US); Leonardo De Paula Rosa Piga, San Francisco, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 800 days.

(21) Appl. No.: 17/135,466

(22) Filed: Dec. 28, 2020

(65) Prior Publication Data

US 2022/0206916 A1  Jun. 30, 2022

(51) Int. Cl.
*G06F 11/30* (2006.01)
*G06F 3/06* (2006.01)
*G06F 11/07* (2006.01)
*G06F 11/20* (2006.01)

(52) U.S. Cl.
CPC ........ *G06F 11/3037* (2013.01); *G06F 3/0611* (2013.01); *G06F 3/0631* (2013.01); *G06F 3/0647* (2013.01); *G06F 3/0653* (2013.01); *G06F 3/0673* (2013.01); *G06F 11/076* (2013.01); *G06F 11/203* (2013.01); *G06F 11/3058* (2013.01)

(58) Field of Classification Search
CPC .. G06F 11/3037; G06F 3/0611; G06F 3/0631; G06F 3/0647; G06F 3/0653; G06F 3/0673; G06F 11/076; G06F 11/203; G06F 11/3058; G06F 11/004; G06F 11/073; G06F 11/3409; G06F 11/3024; G11C 7/04; G11C 11/40626
See application file for complete search history.

(56) References Cited

U.S. PATENT DOCUMENTS

| | | | |
|---|---|---|---|
| 2011/0173410 A1* | 7/2011 | Castillo ............... | G06F 11/3442 711/170 |
| 2014/0281311 A1* | 9/2014 | Walker ................. | G06F 3/0631 711/170 |
| 2016/0124852 A1* | 5/2016 | Shachar .................... | G06T 1/60 345/505 |
| 2017/0004040 A1* | 1/2017 | Chinnakkonda Vidyapoornachary ..................... | G06F 11/1048 |

* cited by examiner

*Primary Examiner* — Masud K Khan

(57) ABSTRACT

Methods and apparatus manage data in memories disposed in a stacked relation with respect to one or more processors. The method includes receiving at least one hint indicating future processor usage of a software component, where the future processor usage is indicative of future usage of the one or more processors when executing the software component or a code section of the software component. In some implementations, the method includes selecting a memory location in the memories for data used by the software component based on the hint.

18 Claims, 11 Drawing Sheets

- CPU boundedness hint ⟵ 510A
- ...
- CPU bound code running on multiple threads
- GPU boundedness hint ⟵ 520A
- Synchronization point for CPU threads
- CPU + GPU concurrency hint ⟵ 530A
- Launch GPU kernels
- CPU bound code running in parallel
- Wait for GPU kernels to complete
- ...

FIG. 5A

| Fields | Bits |
|---|---|
| CPU_Priority | 31..24 |
| CPU_Expected_Utilization | 23..16 |
| GPU_Priority | 15..8 |
| GPU_Expected_Utilization | 7..0 |

510B — CPU_Priority
515B — CPU_Expected_Utilization
520B — GPU_Priority
525B — GPU_Expected_Utilization

FIG. 5B

| Temperature Sensor ID | Current Temperature | Predicted Temperature | Location in Stack (x,y,z) | Process ID | Data Migration DONE? | Address Range | New Address Range |
|---|---|---|---|---|---|---|---|
| 100 | 65 | 73 | (1,1,2) | 352 | Y | 0-100 | 301-400 |
| 101 | 75 | 68 | (1,2,2) | 15 | N | 101-200 | 101-200 |
| ... | ... | ... | ... | ... | ... | ... | ... |
| 405 | 81 | 95 | (4,5,5) | 352 | N | 701-800 | 401-500 |

FIG. 5C

```
for (Every Temperature Sensor in List)
{
    if (Sensor.PredictedTemperature(i) >= Threshold && Sensor.MigrationStatus != DONE &&
Sensor.ProcessID == CallerProcessID)
    {
        OldLocation = getCurrentLocation()
        NewLocation, NewLocationProcessID = getDestinationLocation()
        if(OldLocation != NewLocation && NewLocationProcessID != Sensor.ProcessID )
        {
            swapData(OldLocation, NewLocation)
            UpdateTableLocationInfo()
        }
    }
}
```

FIG. 5D

METHODS AND APPARATUS FOR MANAGING DATA IN STACKED DRAMS

BACKGROUND OF THE DISCLOSURE

Processors, such as central processing units (CPUs), graphics processing units (GPUs), and other computing devices, generate heat when executing various software instructions. In the configurations of processors in a stacked relationship with memories, such as dynamic random-access memories (DRAMs), the processor generated heat will affect performance of the DRAMs. Since stacked DRAMs are volatile memories, they require frequent refreshing storage banks, also referred to storage arrays. The refresh rate is related with temperatures of the storage banks. In general, the higher temperature the storage bank is at, the higher the refresh rate is of the storage bank. When the DRAM banks are getting refreshed, accessing the data in those banks is delayed such that the performance of processor(s) is impacted.

BRIEF DESCRIPTION OF THE DRAWINGS

The embodiments will be more readily understood in view of the following description when accompanied by the below figures and wherein like reference numerals represent like elements, wherein:

FIG. 5A shows an example of hints being used with relevant code sections running on the computing device;

FIG. 5B are illustrative examples of hints;

FIG. 5C shows an exemplary data structure capturing the data in a spatial thermal gradient map with example data;

FIG. 5D is one example pseudocode for managing data in DRAMs;

DETAILED DESCRIPTION OF EMBODIMENTS

Figure 1:
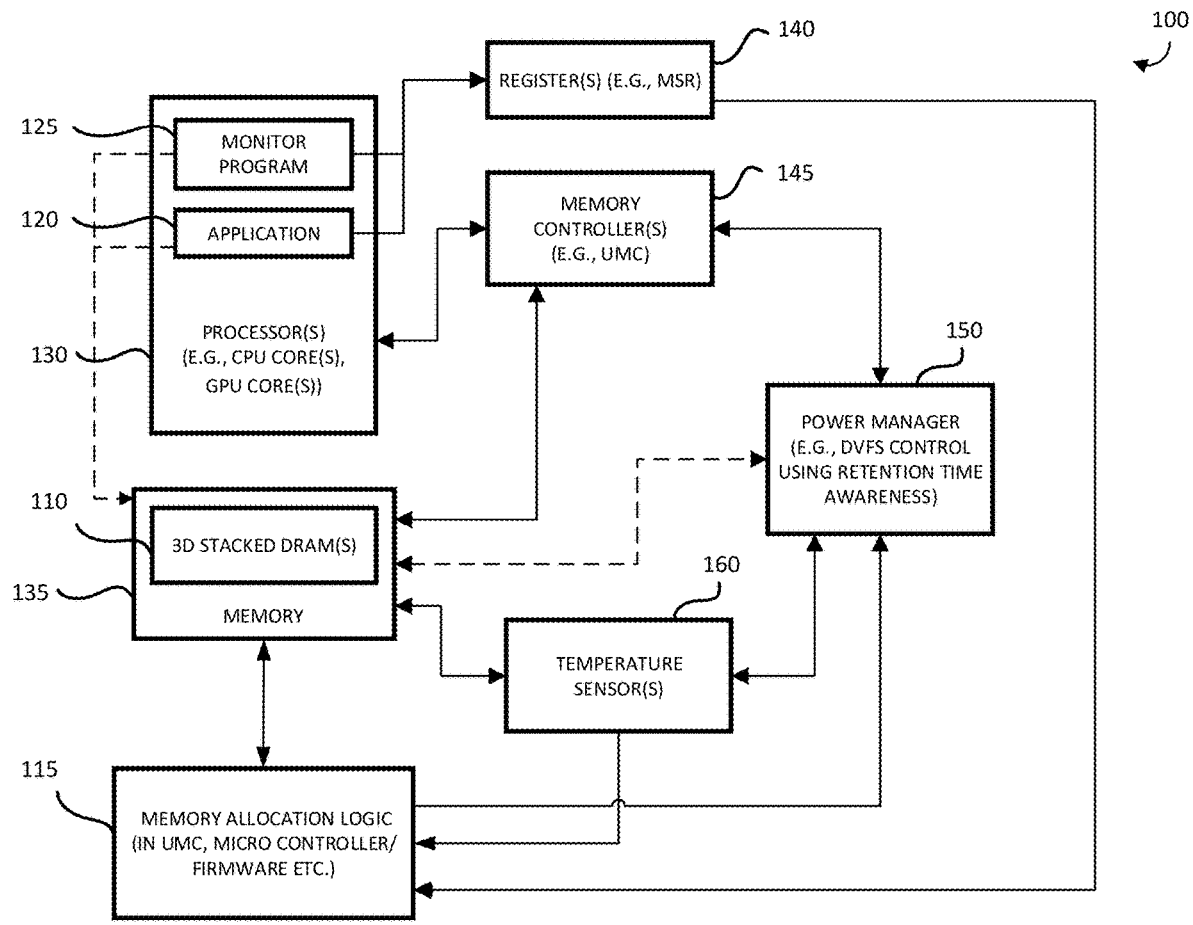
FIG. 1 is a schematic block diagram illustrating a computing device for managing data in one or more memories in accordance with one example set forth in the disclosure.

Methods and apparatus leverage software hints indicating future processor usage to manage data in memory. In the stacked memory-processor architectures, the heat generated by processor(s) changes the temperature associated with the memory and affects the performance of the processor(s). In some variations, the apparatus generates thermal gradient prediction associated with the stacked architecture based at least in part on the software hints and manages data in the stacked memory based at least in part on the thermal gradient prediction.

In certain implementations, a method for managing data in one or more memories, includes receiving at least one hint related to future processor usage of a software component, such as a software application, where the future processor usage is indicative of future usage of the one or more processors when executing at least part of the software component. In some instances, the method includes selecting a memory location in the one or more memories for data used by the software component based on the hint and allocates the data used by the software component at the selected memory location in the one or more memories.

In some examples, the method includes generating a thermal gradient predication for the one or more memories based at least in part on the hint, where selecting a memory location includes selecting the memory location based on the thermal gradient prediction of the one or more memories. In some examples, the method includes receiving temperature data associated with the one or more memories, where the temperature data is collected by a plurality of temperature sensors. In some instances, the method includes generating the thermal gradient prediction for the one or more memories based at least in part on the hint and the received temperature data. In some examples, the thermal gradient prediction for the one or more memories includes a spatial map of the multiple memory layers indicating temperatures, temperature differences, and/or other temperature information at various three-dimensional physical positions of the multiple memory layers.

In some implementations, the one or more memories include DRAMs. In some implementations, the one or more memories are disposed in a stacked relation with respect to the one or more processors. In certain examples, the method includes selecting one or more memory locations in the one or more memories for the software component prior to execution of the at least part of the software component, where the selected one or more memory locations are predicted to be at a lower temperature than other memory locations of the one or more memories. In certain instances, the example includes migrating the data used by the software component from a first memory location in the one or more memories to the selected memory location in the one or more memories for the software component prior to execution of the at least part of the software component, where the selected memory location is predicted to be at a lower temperature than the first memory location of the one or more memories.

In some examples, the software component comprises an application that includes executable code that includes the hint, where the software component is configured to write the hint to a register. In some instances, the method includes receiving the hint from the register, where the hint is generated based upon an analysis of the software component.

In some instances, the method includes determining temperature information of the one or more memories when the software component is being executed by the one or more processors; and migrating the data used by the software component from a third memory location in the one or more memories to a fourth memory location in the one or more memories based on the determined temperature information. The fourth memory location is different from the third memory location.

In some implementations, the hint includes a hint indicative of a processor priority of the at least part of the software component. In some instances, the hint comprises a hint indicative of a first processor of the one or more processors executing the software component concurrently with a second processor of the one or more processors executing the software component, where the second processor is different from the first processor.

In certain implementations, an apparatus includes one or more processors and a memory allocation logic that receives at least one hint related future processor usage of a software component. In some implementations, the future processor usage is indicative of future usage of the one or more processors when executing at least part of the software component. The memory allocation logic selects a memory location in the one or more memories for data used by the software component based on the hint and allocates the data used by the software component at the selected memory location in the one or memories.

In some examples, the memory allocation logic generates a thermal gradient predication for the one or more memories based at least in part on the hint. In some instances, the memory allocation logic selects the memory location based on the thermal gradient prediction of the one or more memories.

In some implementations, the memory allocation logic receives temperature data associated with the one or more memories, the temperature data collected by a plurality of temperature sensors and generates the thermal gradient prediction for the one or more memories based at least in part on the hint and the received temperature data. In some examples, the memory allocation logic selects one or more memory locations in the one or more memories for the software component prior to execution of the at least part of the software component, where the selected one or more memory locations are predicted to be at a lower temperature than other memory locations of the one or more memories.

In certain implementations, the memory allocation logic migrates the data used by the software component from a first memory location in the one or more memories to the selected memory location in the one or more memories for the software component prior to execution of the at least part of the software component, where the selected memory location is predicted to be at a lower temperature than the first memory location of the one or more memories. In some examples, the software component includes an application that includes executable code that comprises the hint and is configured to write the hint to the register. In some instances, the memory allocation logic receives the hint from a register, where the hint is generated based upon an analysis of the software component.

In some implementations, the memory allocation logic determines temperature information of the one or more memories when the software component is executed by the one or more processors. In some instances, the memory allocation logic migrates the data used by the software component from a third memory location in the one or more memories to a fourth memory location in the one or more memories based on the determined temperature information, where the fourth memory location is different from the third memory location. In some examples, the hint comprises a hint indicative of a processor priority of the at least part of the software component.

In certain implementations, a method for managing data in one or more memories disposed in a stack relation with respect to one or more processors, includes receiving at least one hint indicating future processor usage of a software component, the future processor usage indicative of future usage of the one or more processors when executing at least part of the software component. In some instances, the method includes receiving temperature data associated with the one or more memories, the temperature data collected by a plurality of temperature sensors. In some instances, the method includes generating the thermal gradient prediction for the one or more memories based at least in part on the hint and the received temperature data. In some instances, the method includes allocating one or more memory locations in the one or more memories for the software component prior to execution of the at least part of the software component based on the thermal gradient prediction of the one or more memories, where the allocated one or more memory locations are predicted to be at a lower temperature than other memory locations of the one or more memories.

FIG. 1 is a schematic block diagram illustrating a computing device 100 for managing data in one or more memories in accordance with one example set forth in the disclosure. In some implementations, the computing device 100 includes any type of computing device suitable for implementing aspects of embodiments of the disclosed subject matter. Examples of computing devices include but are not limited to laptops, desktops, tablet computers, hand-held devices, display devices, media players, televisions, game consoles, printers, servers, cloud computing platforms, integrated circuits and the like, all of which are contemplated within the scope of FIG. 1, with reference to various components of the computing device 100.

In some examples, the computing device 100 includes one or more memories 135, such as DRAMs 110, a memory allocation logic 115, one or more processors (e.g., central processing unit (CPU), graphics processing unit (GPU), general purpose GPU (GPGPU), accelerated processing unit (APU), and/or compute unit (CU)) 130, register(s) 140, memory controller(s) 145, a power manager 150, and temperature sensor(s) 160. Any number of additional components, different components, and/or combinations of components is also included in the computing device 100. One or more of the components are optional to the computing device 100.

In some implementations, the computing device 100 includes one or more address buses and/or data buses that, directly and/or indirectly, couple various components of the computing device 100. In some designs, any number of the components of computing device 100, or combinations thereof, may be distributed and/or duplicated across a number of computing devices. In some variations, the computing device 100 includes any number of processors (e.g., CPUs, GPUs, etc.) 130. For example, in one variation, the computing device 100 includes one CPU. In other variations, the computing device 100 includes two or five CPUs. For example, in one variation, the computing device 100 includes one GPU. In other variations, the computing device 100 includes ten or fifteen GPUs.

In some implementations, an application 120, which includes executable instructions stored in memory(s) 135, is loaded on the one or more processors 130 to be executed by the one or more processors 130. As used herein, a processor refers to one or more CPUs, GPUs, GPGPUs, APUs, and/or other processing units. In some variations, the application 120 is also referred to as a software component, which includes a plurality of software instructions to be executed by a processor. In some variations, the software instructions include instructions in a high-level programming language, which is also referred to as user-level application code. In some variations, the software instructions include computer/machine readable code, or referred to as compiled code. In some variations, the application/software component 120 refers to both the user-level application code and the computer/machine readable code or any other suitable level of code.

In some implementations, the application 120 writes one or more hints to the register(s) 140 (e.g., model specific register ("MSR")), for example, when the application 120 is loaded onto the one or more processors 130. The application 120 includes one or more code sections. In some implementations, the application 120 writes one or more hints to the register(s) 140 when the application or a code section of the application is executed by the one or more processors 130. In one example, the application 120 writes a hint indicating future processor usage of a code section of the application 120 when the application 120 is executed by the one or more processors 130. In some variations, the application 120 (e.g., the user-level application code, compiled code) includes the one or more hints. In some variations, the user-level application code includes the one or more hints. In one example, the one or more hints in the user-level application code are written by a software developer. In some variations, the one or more hints are generated by a compiler when compiling the application 120.

In some implementations, the one or more hints include a hint indicative of future processor usage of the application 120. In some implementations, the one or more hints include a hint indicative of a priority of the future processor usage of the application 120. In some implementations, the one or more hints include a hint indicative of future processor usage of a code section of the application 120. In some implementations, the one or more hints include a hint indicative of a priority of the future processor usage of the code section of the application 120. As used herein, a priority of processor usage is a relative priority value with respect to other applications/software components. In some implementations, other software hints (e.g., processor intensity, etc.) are used for managing data in the stacked DRAMs 110.

In some implementations, the one or more hints include a CPU usage hint indicative of future CPU usage of the application 120. In some implementations, the one or more hints include a CPU priority hint indicative of a priority of the future CPU usage of the application 120. In some implementations, the one or more hints include a CPU usage hint indicative of future CPU usage of a code section of the application 120. In some implementations, the one or more hints include a CPU priority hint indicative of a priority of the future CPU usage of the code section of the application 120.

In some implementations, the one or more hints include a GPU usage hint indicative of future GPU usage of the application 120. In some implementations, the one or more hints include a GPU priority hint indicative of a priority of the future GPU usage of the application 120. In some implementations, the one or more hints include a GPU usage hint indicative of future GPU usage of a code section of the application 120. In some implementations, the one or more hints include a GPU priority hint indicative of a priority of the future GPU usage of the code section of the application 120.

In some implementations, the one or more hints include a CPU/GPU usage hint indicative of future CPU and/or GPU usage of the application 120. In some implementations, the one or more hints include a CPU/GPU priority hint indicative of a priority of the future CPU and/or GPU usage of the application 120. In some implementations, the one or more hints include a CPU/GPU usage hint indicative of future CPU and/or GPU usage of a code section of the application 120. In some implementations, the one or more hints include a CPU/GPU priority hint indicative of a priority of the future CPU and/or GPU usage of the code section of the application 120. In some implementations, the application 120 includes executable code that includes the one or more hints and writes the one or more hints to the register(s) 140.

In some implementations, the one or more hints include a hint related to a first processor of the one or more processors 130 executing the application 120 concurrently with a second processor of the one or more processors 130 executing the application 120. In some variations, the one or more hints include a hint indicative of a future processor usage of both the first processor and the second processor. In some variations, the one or more hints include a hint indicative of a priority of the future process usage of both the first processor and the second processor.

In some implementations, the monitor program 125, an optional component, is running on the one or more processors 130 to monitor processor usage of the application 120. In some variations, the monitor program 125 predicts future processor usage of the application 120, generates the one or more hints and writes the one or more hints to the registers 140. In some variations, the one or more hints are generated based upon an analysis of the application 120. In some implementations, the memory allocation logic 115 manages data used by the application 120 (e.g., selects memory location(s) for data, allocates data, migrates data, etc.) and other applications based on the one or more hints. In some variations, data used by an application/software component includes input data, intermediately generated data, and output data of the application/software component. In some examples, the memory allocation logic 115 is implemented by the memory controller 145, firmware of the micro controller, the one or more processors 130, and/or the like.

Figure 2:
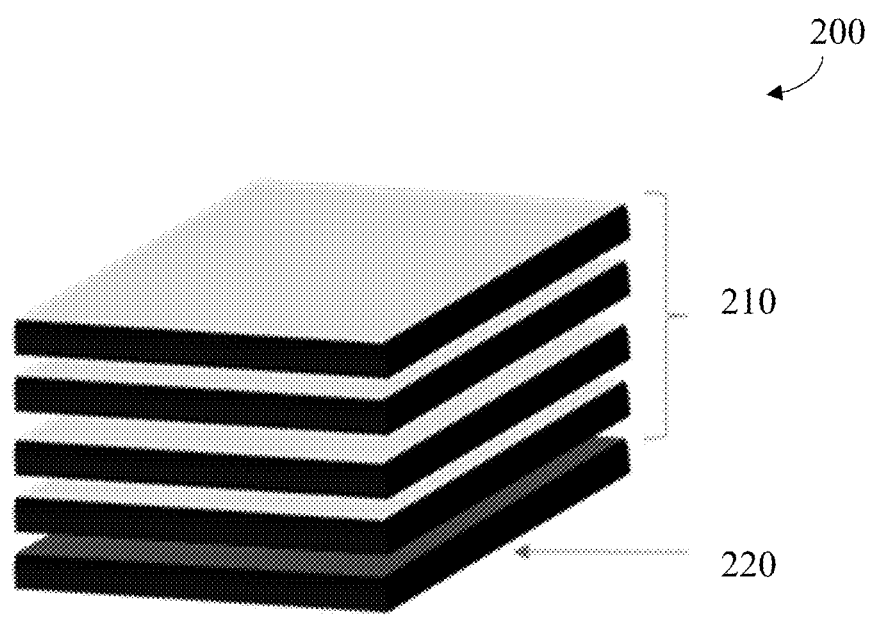
FIG. 2 is an exemplary representation of a stacked memory-processor architecture, in accordance with one example set forth in the disclosure.

FIG. 2 is an exemplary representation of stacked memory-processor architecture 200, in accordance with one example set forth in the disclosure. In particular, the stacked memory-processor architecture 200 includes DRAM layers 210 in a stack relation with a processor layer 220. In some implementations, the processor layer 220 is located below the stacked DRAMs. In some instances, a processor layer is located above the stacked DRAMs, and/or between DRAM layers. In some variations, the memory allocation logic 115 is aware of and/or receives the physical positions of the processors and DRAMs.

In some implementations, the memory allocation logic 115 generates a thermal gradient predication for the stacked DRAMs 110 based at least in part on the one or more hints. In one example, the memory allocation logic 115 generates the thermal gradient prediction for the stacked DRAMs 110 based on a hint of future processor usage and the floorplan information of the stacked DRAMs and processors. In some examples, the thermal gradient prediction for the one or more memories includes data indicating temperatures, temperature differences, and/or other temperature information at various three-dimensional physical positions of the stacked memories. In some examples, the thermal gradient prediction for the one or more memories includes a spatial map of multiple memory layers indicating temperatures, temperature differences, and/or other temperature information at various three-dimensional physical positions of the multiple memory layers.

In some implementations, floorplan information includes thermal resistance and capacitance of each of the silicon layers, the thickness of each of the layers, the location of heat sink, and other related information. In some variations, the memory allocation logic 115 manages the memory location for data used by the application 120 based at least in part on the thermal gradient prediction of the stacked DRAMs. In some implementations, the memory allocation logic 115 generates the thermal gradient prediction for the stacked DRAMs 110 based on temperature data associated with the stacked DRAMs 110. In some variations, the temperature data is collected by the temperature sensors 160 and received by the memory allocation logic 115.

In some implementations, the computing device 100 includes one or more temperature sensors 160. Each temperature sensor 160 detects and/or provides temperature readings or feedback to various components of the computing device 100. The temperature sensor 160 can be any sensor or transducer, such as an on-die temperature sensor, which detects temperature. In some variations, the one or more temperature sensors 160 are disposed at various location in the stacked memory-processor architecture (e.g., the memory-processor architecture 200 in FIG. 2).

In certain implementations, the memory allocation logic 115 receives the one or more software hints. As used herein, "receive" or "receiving" includes obtaining data from a register or other data source, retrieving data from a data repository, receiving data from a communication link, and/or the like. In some implementations, the memory allocation logic 115 allocates one or more memory locations in the stacked DRAMs for the application 120 prior to execution of the code section of the software component, where the allocated one or more memory locations are predicted to be at a lower temperature than other memory locations of the stacked DRAMs.

In some implementations, the memory allocation logic 115 migrates the data used by the software component from a first memory location in the stacked DRAMs to a second memory location in the stacked DRAMs for the software component prior to execution of the code section of the software component, where the second memory location is predicted to be at a lower temperature than other memory locations of the stacked DRAMs. In some implementations, the memory allocation logic 115 receives the one or more hints including one or more executable instructions (e.g., malloc, load, store, read, write, etc.).

In some implementations, the memory allocation logic 115 predicts temperature information of the stacked DRAMs when the application 120 or a code section of the application 120 is being executed by the one or more processors 130 and migrates the data used by the application 120 from a first memory location in the stacked DRAMs 110 to a second memory location in the stacked DRAMs 110 based on the predicted temperature information and/or thermal gradient prediction for the stacked DRAMs 110, where the second memory location is different from the first memory location. In some examples, the memory allocation logic 115 migrates the frequently accessed data to memory locations with longer retention times, such as memory locations having predicted lower temperature than some other memory locations.

In some implementations, the memory allocation logic 115 determines current temperature information of the stacked DRAMs when the application 120 is being executed by the one or more processors 130 and migrates the data used by the application 120 from a first memory location in the stacked DRAMs to a second memory location in the stacked DRAMs based on the current temperature information, where the second memory location is different from the first memory location. In some examples, the memory allocation logic 115 migrates the frequently accessed data to memory locations with longer retention times, such as memory locations having lower temperature currently than some other memory locations.

In some instances, the memory allocation logic 115 monitors and predicts localized temperatures, and thereby localized refresh rates, within the stacked DRAM to understand and take advantage of a respective actual or required refresh rate of each location/region of memory. According to certain embodiments, DRAM retention time variations are exposed to a hardware component (e.g., a memory controller 145) or to a system software component (e.g., an operating system (OS) or a hypervisor). The hardware or software component performs a retention-aware data placement thereby improving memory access performance and reducing the chance for memory access collisions. Using this approach, refresh rate changes are detected, and data are moved to a new location based on the detected refresh rate changes.

In some implementations, the memory allocation logic 115 coordinates with the memory controller(s) 145 to allocate and/or migrate data used by the application 120 or a code section of the application 120. In some examples, a memory controller 145 controls memory access to (e.g., sending read requests, sending write requests, etc.) the stacked DRAMs 110. In some examples, the computing device 100 includes a plurality of memory controllers 145. In some variations, a memory controller 145 controls a portion of the stacked DRAMs 110. In some other variations, a memory controller 145 controls multiple stacked DRAMs 110.

In some implementations, the memory allocation logic 115 coordinates with the power manager 150 (e.g., dynamic voltage frequency setting ("DVFS") control, firmware power management, etc.) to manage data for stacked DRAMs. In some instances, the DVFS control modulates the clock frequencies of the one or more the processors 130 to manage the power consumed by one or more the processors 130. In some implementations, various memory allocation embodiments are used in stacked DRAMs and processor architectures. In some implementations, various memory allocation embodiments are used in other stacked memory-processor architectures.

In some implementations, the present disclosure provides a solution using hints of future processor usage to predict temperature and/or thermal gradient to select a memory location to allocate or migrate data for a software application. Such solution is a proactive solution to select memory location in comparison with systems of migrating data in memory based upon current temperature or temperature gradient. In some implementations, the proactive solution using hints of future processor usage can improve effectiveness and efficiency in managing data in memory, for example, by providing better effectiveness and efficiency in managing data in memory than the reactive solution of migrating data based upon current temperature or temperature gradient.

Figure 3:
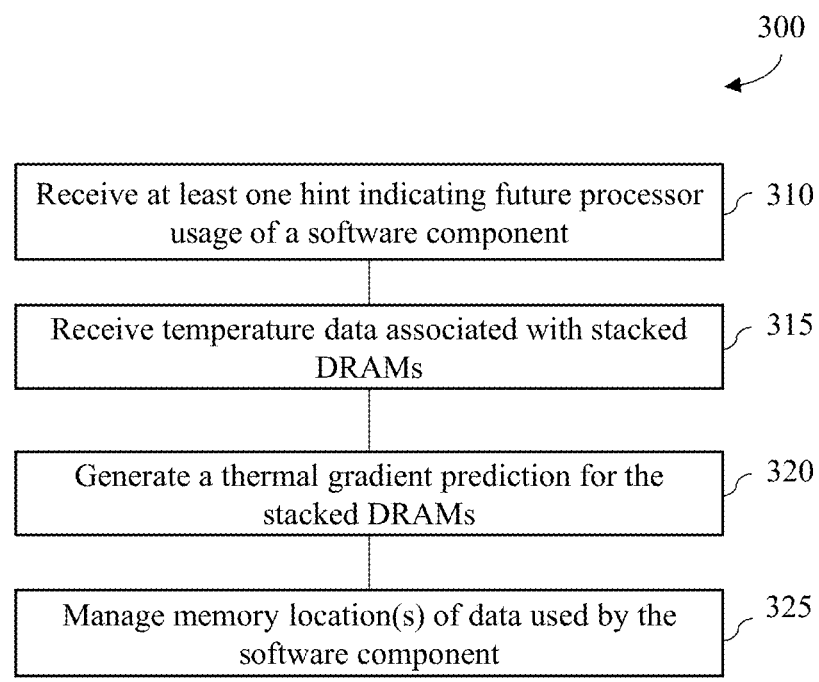
FIG. 3 is a flowchart illustrating one example of a method for managing data in DRAMs in accordance with one example set forth in the disclosure.

FIG. 3 is a flowchart illustrating one example of a method 300 for managing data in DRAMs in accordance with one example set forth in the disclosure. Aspects of embodiments of the method 300 are performed, for example, by a computing device (e.g., the computing device 100 in FIG. 1) or a memory allocation logic (e.g., the memory allocation logic 115 in FIG. 1). In some implementations, one or more steps of method 300 are optional and/or modified by one or more steps of other embodiments described herein. In some implementations, one or more steps of other embodiments described herein are added to the method 300. In this example, the memory allocation logic receives at least one hint indicating future processor usage of a software component (310).

In some implementations, the software component writes one or more hints to the register(s) (e.g., model specific register ("MSR")), for example, when the software component is loaded onto one or more processors. The software component includes one or more code sections. In some implementations, the software component writes one or more hints to the register(s) when it is executed by the one or more processors. In one example, the software component writes a hint indicating future processor usage of a code section of the software component when the software component is executed by the one or more processors. In some variations, the software component (e.g., the user-level application code, compiled code) includes the one or more hints. In some variations, the user-level application code includes the one or more hints. In one example, the one or more hints in the user-level application code are written by a software developer. In some variations, the one or more hints are generated by a compiler when compiling the software component. In some other variations, the one or more hints are generated by a monitor program (e.g., the monitor program 125 in FIG. 1) based on the execution behavior of the software component when it is running on the one or more processors.

In some implementations, the one or more hints include a hint indicative of future processor usage of the software component. In some implementations, the one or more hints include a hint indicative of a priority of the future processor usage of the software component. In some implementations, the one or more hints include a hint indicative of future processor usage of a code section of the software component. In some implementations, the one or more hints include a hint indicative of a priority of the future processor usage of the code section of the software component. As used herein, a priority of processor usage is a relative priority value with respect to other applications/software components.

In some implementations, the one or more hints include a CPU usage hint indicative of future CPU usage of the software component. In some implementations, the one or more hints include a CPU priority hint indicative of a priority of the future CPU usage of the software component. In some implementations, the one or more hints include a CPU usage hint indicative of future CPU usage of a code section of the software component. In some implementations, the one or more hints include a CPU priority hint indicative of a priority of the future CPU usage of the code section of the software component.

In some implementations, the one or more hints include a GPU usage hint indicative of future GPU usage of the software component. In some implementations, the one or more hints include a GPU usage hint indicative of a priority of the future GPU usage of the software component. In some implementations, the one or more hints include a GPU priority hint indicative of future GPU usage of a code section of the software component. In some implementations, the one or more hints include a GPU priority hint indicative of a priority of the future GPU usage of the code section of the software component.

In some implementations, the one or more hints include a CPU/GPU usage hint indicative of future CPU and/or GPU usage of the software component. In some implementations, the one or more hints include a CPU/GPU usage hint indicative of a priority of the future CPU and/or GPU usage of the software component. In some implementations, the one or more hints include a CPU/GPU priority hint indicative of future CPU and/or GPU usage of a code section of the software component. In some implementations, the one or more hints include a CPU/GPU priority hint indicative of a priority of the future CPU and/or GPU usage of the code section of the software component. In some implementations, the software component includes executable code that includes the one or more hints and writes the one or more hints to a hardware register.

In some implementations, the one or more hints include a hint related to a first processor executing the software component concurrently with a second processor executing the software component. In some variations, the one or more hints include a hint indicative of a future processor usage of both the first processor and the second processor. In some variations, the one or more hints include a hint indicative of a priority of the future process usage of both the first processor and the second processor.

In some implementations, a monitor program is running on the one or more processors to monitor processor usage and application behavior of the software component. In some variations, the monitor program predicts future processor usage of the software component and generates the one or more hints and writes the one or more hints to the register(s). In some variations, the one or more hints are generated based upon an analysis of the software component. In some implementations, the memory allocation logic manages data used by the software component (e.g., selects memory location(s), allocates data, migrates data, etc.) and other applications based on the one or more hints. In some examples, the memory allocation logic is implemented by memory controller(s) (e.g., memory controller 145 in FIG. 1), firmware of the micro controller, the one or more processors, a combination thereof, and/or the like.

In some implementations, the memory allocation logic receives temperature data associated with stacked DRAMs (315). In some variations, the temperature data includes temperature data associated with processors. In some implementations, the temperature data is collected by one or more temperature sensors disposed at various locations of the stacked memory-processor architecture. Each temperature sensor detects and/or provides temperature readings or feedback to the memory allocation logic. The temperature sensor(s) can be any sensor or transducer, such as an on-die temperature sensor, which detects temperature.

In some implementations, the memory allocation logic generates a thermal gradient predication for the stacked DRAMs (320). In some variations, the thermal gradient prediction is generated based at least in part on the hints. In some variations, the memory allocation logic generates the thermal gradient prediction for the stacked DRAMs based at least in part on the at one hint and the received temperature data. In one example, the memory allocation logic generates the thermal gradient prediction for the stacked DRAMs based on a hint of future processor usage and the floorplan information of the stacked DRAMs and processors.

In some variations, the memory allocation logic manages the memory location for data used by the software component (325) (e.g., selects memory location(s) for data, allocates data, migrates data, etc.) based at least in part on the one or more hints. In some instances, the memory allocation logic selects the memory location for data used by the software component based at least in part on the thermal gradient prediction of the stacked DRAMs. In one instance, the memory allocation logic allocates the data used by the software component at the selected memory location in one or more memory locations in the stacked DRAMs for the software component when it is loaded onto the one or more processors. In one instance, the memory allocation logic migrates the data used by the software component from a current memory location to the selected memory location in the stack stacked DRAMs for the software component based on hints indicative of future processor usage and thermal gradient prediction when the software component is being executed.

In some implementations, the memory allocation logic selects one or more memory locations in the stacked DRAMs for the software component prior to execution of the code section of the software component, where the selected one or more memory locations are predicted to be at a lower temperature than other memory locations of the stacked DRAMs. In some implementations, the memory allocation logic allocates data used by the software component at the selected one or more memory locations prior to execution of the code section of the software component. In some implementations, the memory allocation logic migrates the data used by the software component from a first memory location in the stacked DRAMs to a second memory location in the stacked DRAMs for the software component prior to execution of the code section of the software component, where the second memory location is predicted to be at a lower temperature than other memory locations of the stacked DRAMs. In some implementations, the memory allocation logic receives the one or more hints including one or more executable instructions (e.g., malloc, load, store, read, write, etc.).

In some implementations, the memory allocation logic determines temperature information of the stacked DRAMs during the software component is executed by one or more processors, and migrates the data used by the software component from a first memory location in the stacked DRAMs to a second memory location in the stacked DRAMs based on the determined temperature information, where the second memory location is different from the first memory location.

Figure 4:
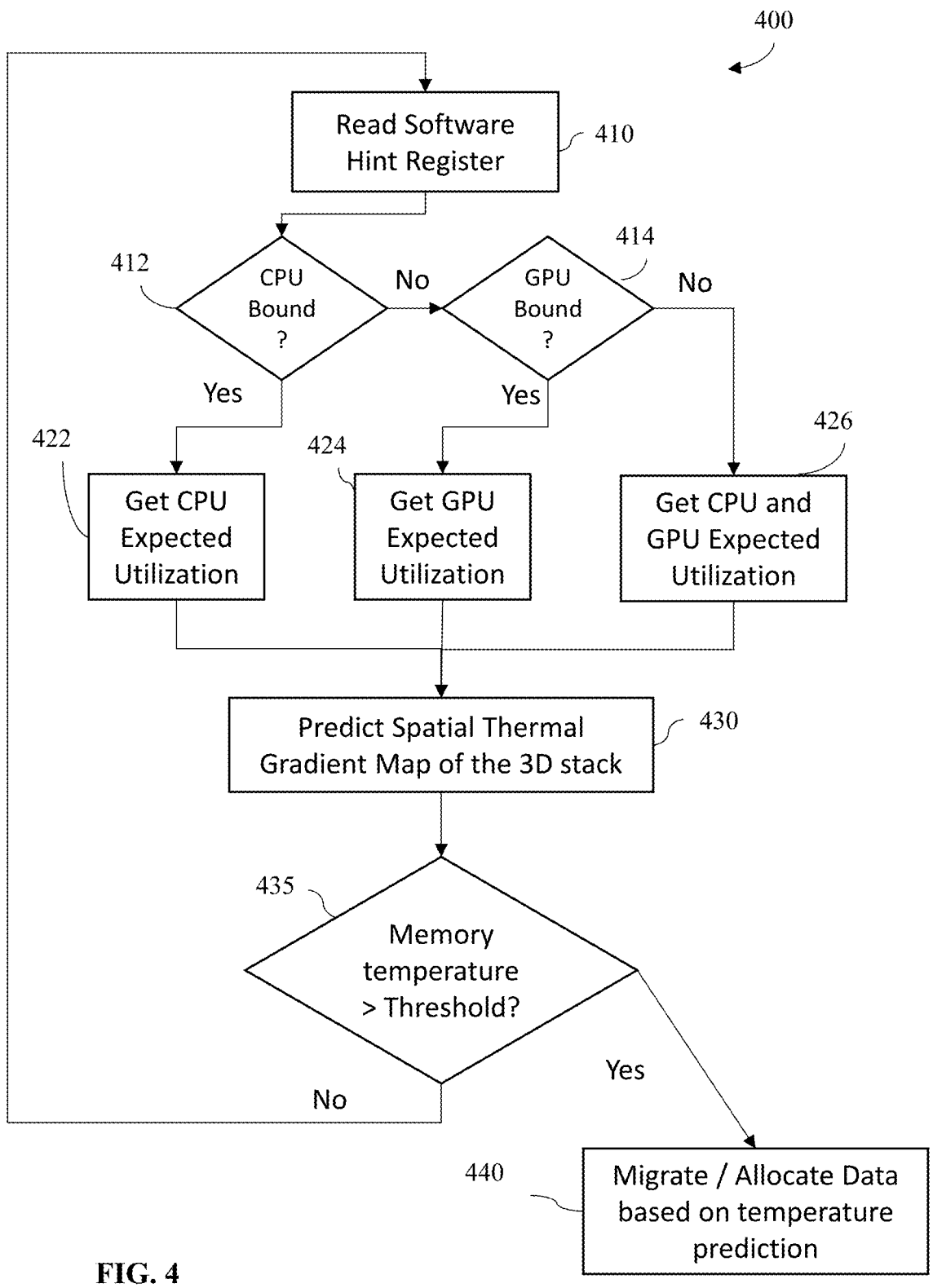
FIG. 4 is a flowchart illustrating another example of a method for managing data in DRAMs in accordance with one example set forth in the disclosure.

FIG. 4 is a flowchart illustrating another example of a method 400 for managing data in DRAMs in accordance with one example set forth in the disclosure. Aspects of embodiments of the method 400 are performed, for example, by a computing device (e.g., the computing device 100 in FIG. 1) or a memory allocation logic (e.g., the memory allocation logic 115 in FIG. 1). In some implementations, one or more steps of method 400 are optional and/or modified by one or more steps of other embodiments described herein. In some implementations, one or more steps of other embodiments described herein are added to the method 400. In this example, the memory allocation logic or the computing device reads the software hint register (410). In some variations, the software hint being read is related to a specific code section, for example, a next code section of a software component to be executed, a next code section with intense processor usage of a software component to be executed, and the like.

FIG. 5A shows an example of hints being used with relevant code sections running on the computing device. In this example, 510A is an example of CPU boundedness hint being read by the computing device, 520A is an example of GPU boundedness hint being read by the computing device, and 530A is an example of CPU/GPU concurrent hint being read by the computing device. FIG. 5B are illustrative examples of hints. In this example, the one or more hints written to the register include CPU_Priority hint 510B indicative of a priority of future CPU usage priority, CPU_Expected_Utilization hint 515B indicative of the future CPU usage, GPU_Priority hint 520B indicative of a priority of future GPU usage priority, and GPU_Expected_Utilization hint 525B indicative of the future GPU usage.

Referring back to FIG. 4, in some implementations, the computing device evaluates whether the specific code section is CPU bound (i.e., CPU utilization is greater than zero and GPU utilization is zero or GPU utilization is very small compared to CPU utilization) (412). If the specific code section is not CPU bound, the computing device evaluates whether the specific code section is GPU bound (i.e., GPU utilization is greater than zero and CPU utilization is zero or CPU utilization is very small compared to GPU utilization) (414). If the specific code section is CPU bound, the computing device gets CPU expected utilization (422), for example, from a hint like 515B in FIG. 5B. If the code section is GPU bound, the computing device gets GPU expected utilization (424), for example, from a hint like 525B in FIG. 5B. If the specific section is neither CPU bound nor GPU bound (i.e., CPU utilization and GPU utilization are similar, the computing device gets CPU and GPU expected utilization (426), for example, from a hint indicative of a future CPU and GPU concurrent usage. The CPU expected utilization, GPU expected utilization, and/or CPU and GPU expected utilization are collectively referred to as processor expected utilization.

In some implementations, the computing device predicts spatial thermal gradient map of the 3D stack (430) based on the processor expected utilization. In some implementations, the 3D stack refers to the stacked memory-processor architecture. In some implementations, the spatial temperature map is predicted based on current temperature data. More details on spatial thermal gradient map are provided below.

In some implementations, the computing device checks whether the predicted temperature at a relevant memory location is greater than a threshold (435). In some variations, the relevant location is the memory location(s) of data used by the specific code section and/or the software component. In some variations, the relevant location includes any location of the memory. In some implementations, the threshold is a predetermined threshold. In some implementations, the threshold is adjusted by the computing device. If the predicted temperature is greater than the threshold, the computing device migrates or allocates data based on temperature prediction (440), for example, using the predicted spatial thermal gradient map. If the predicted temperature is not greater than the threshold, the computing device goes back to read the next software hint.

In some implementations, the loop in method 400 is executed periodically. In some variations, the loop is executed when a new hint is received or written to the register. FIG. 5C shows an exemplary data structure capturing the data in a spatial thermal gradient map with example data. In this example, the data structure includes temperature sensor ID, current temperature, predicted temperature, location (e.g., x-y-z coordinates) in the 3D stacked memory-processor architecture, process ID (e.g., ProcessID), data-migration completion information (e.g., DataMigrationDONE), address range in the memory, and new address range in the memory. FIG. 5D is one example pseudocode for managing data in DRAMs. In this example, getCurrentLocation( ) fetches the current address range; getDestinationLocation( ) returns the new location where the data to be migrated, which also returns the ProcessID field (e.g., the ProcessID field in FIG. 5C). In some implementations, an algorithm is used to find the coldest or colder address range and return the address range. swapData( ) migrates the data from the old location to the new location. UpdateTableLocationInfo( ) updates the following fields: NewAddressRange and DataMigrationDONE, where DataMigrationDONE is set to "yes" (i.e., "Y") for old and new memory locations, and the new address range is updated. In some variations, ProcessID field is updated every time a data is accessed in that region. The ProcessID information helps keep track of DRAM regions accessed by the ProcessID which demands data remapping.

In the hardware-only based method, the processor is agnostic to the re-mapping. The memory controller gets the physical address requested by the CPU or GPU. It translates this physical address further based on the corresponding new address range.

Figure 6:
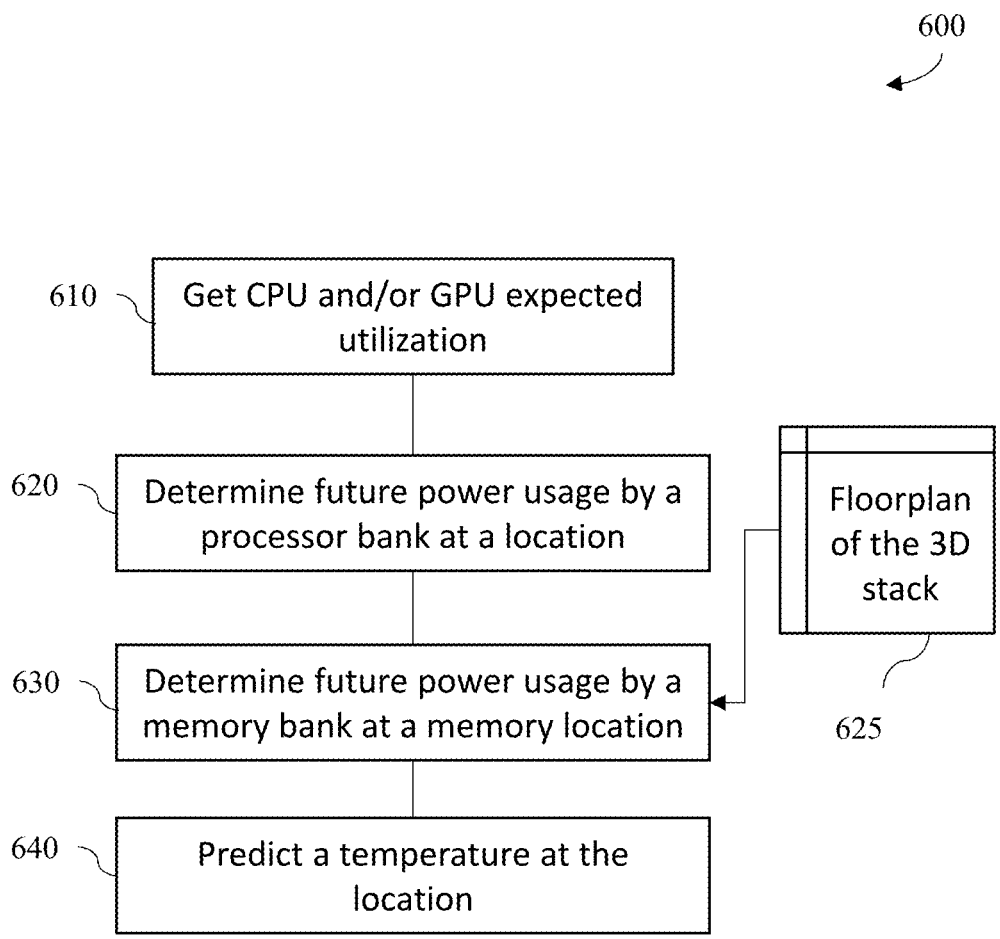
FIG. 6 is a flowchart illustrating one example of a method 600 for thermal gradient predication in the stacked memory-processor architecture in accordance with one example set forth in the disclosure.

FIG. 6 is a flowchart illustrating one example of a method 600 for thermal gradient predication in the stacked memory-processor architecture in accordance with one example set forth in the disclosure. Aspects of embodiments of the method 600 are performed, for example, by a computing device (e.g., the computing device 100 in FIG. 1) or a memory allocation logic (e.g., the memory allocation logic 115 in FIG. 1). In some implementations, one or more steps of method 600 are optional and/or modified by one or more steps of other embodiments described herein. In some implementations, one or more steps of other embodiments described herein are added to the method 600. In this example, the memory allocation logic or the computing device gets the CPU and/or GPU expected utilization (610), for example, based on one or more hints. In some implementations, the computing device determines future power usage at a processor bank at a location (620) based on the expected utilization. In one implementation, the future power usage Power(x,y,z) by a processor bank at a location (x, y, z) is determined using equation (1) below:

$$\text{Power}(x,y,z) = \alpha(x,y,z) \times f^3(x,y,z) \quad (1),$$

where Power(x, y, z) is the predicted power usage at the processor layer location (x, y, z), $\alpha$(x, y, z) is the processor utilization information at the processor layer location, and f(x, y, z) is the processor frequency at the processor layer location.

In some implementations, the computing device determines future power usage by a memory bank (e.g., DRAMs bank) at a memory location (630) using floorplan of the 3D stack (625). In some implementations, floorplan information includes thermal resistance and capacitance of each of the silicon layers, the thickness of each of the layers, the location of heat sink, and other related information. In one implementation, the current power usage is used as an estimation for future power consumed. Power(x,y,z), which is power consumed by a memory bank at a location (x, y, z), is determined by multiplying the supplied voltage and measured current. In one example, the current is measured via current sense resistors. In some variations, the computing device predicts temperature at the location (640), associated with the 3D stack based on the power usage of the processor(s) and/or memories.

In one implementation, the temperature is predicted using equation (2) below:

$$\text{Temp}_{Future}(x,y,z) = M(x,y,z) \times \text{Power}(x,y,z) + \text{Temp}_{Current}(x,y,z) \quad (2),$$

where $\text{Temp}_{Future}$ (x, y, z) is the predicted temperature at location (x, y, z), M(x, y, z) includes the thermal resistance and capacitance at location (x, y, z), Power(x, y, z) is the predicted power usage at the 3D stack location (x, y, z), and $\text{Temp}_{Current}$ (x, y, z) is the predicted temperature at location (x, y, z). In some instances, the computing device generates the thermal gradient prediction for a stacked architecture based on the predicted temperature data. In one example, the thermal gradient prediction includes a ratio of temperatures difference and physical location distance at various physical locations in the stacked architecture.

Figure 7A:
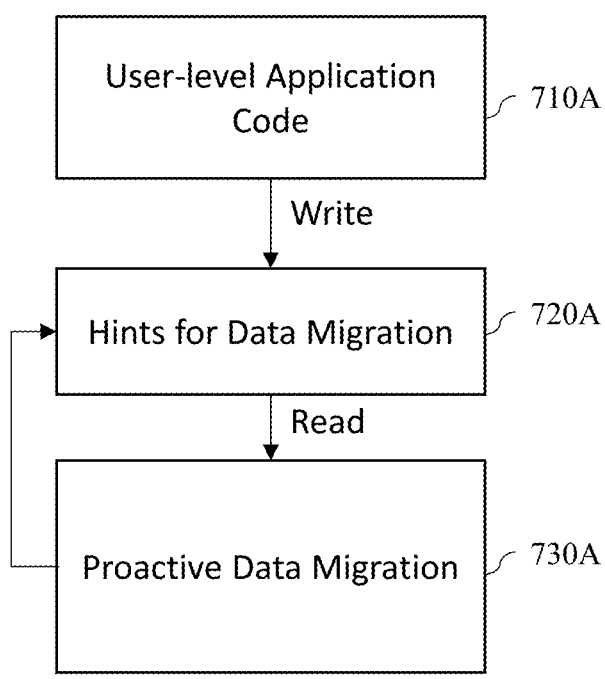
FIGS. 7A-7C are flow diagrams illustrating some exemplary processes for managing data in DRAMs in accordance with examples set forth in the disclosure.
Figure 7B:
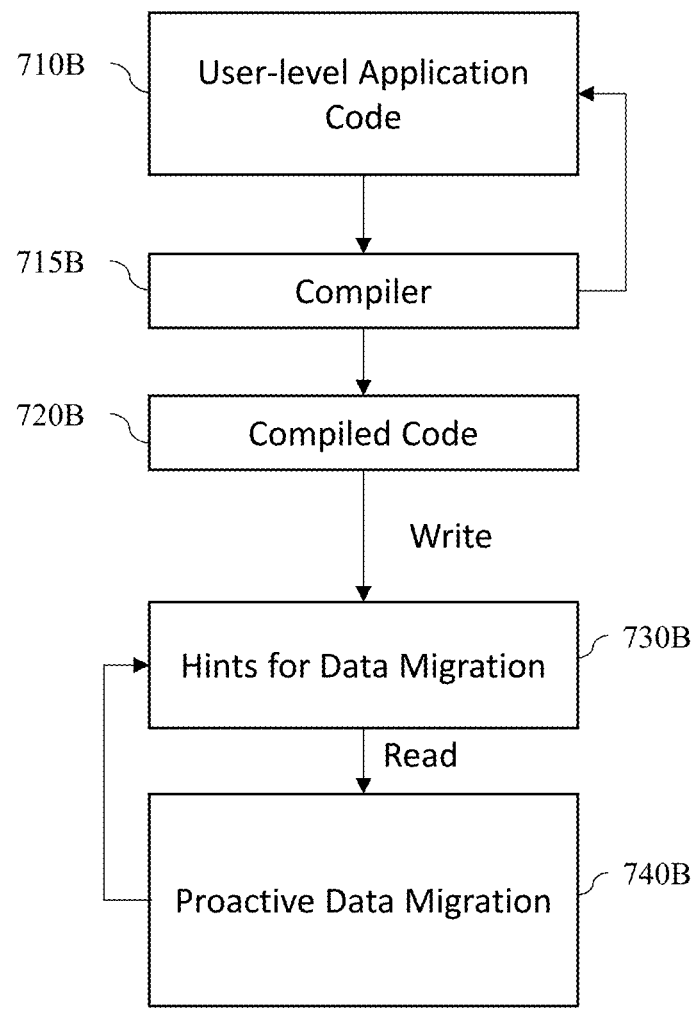
Figure 7C:
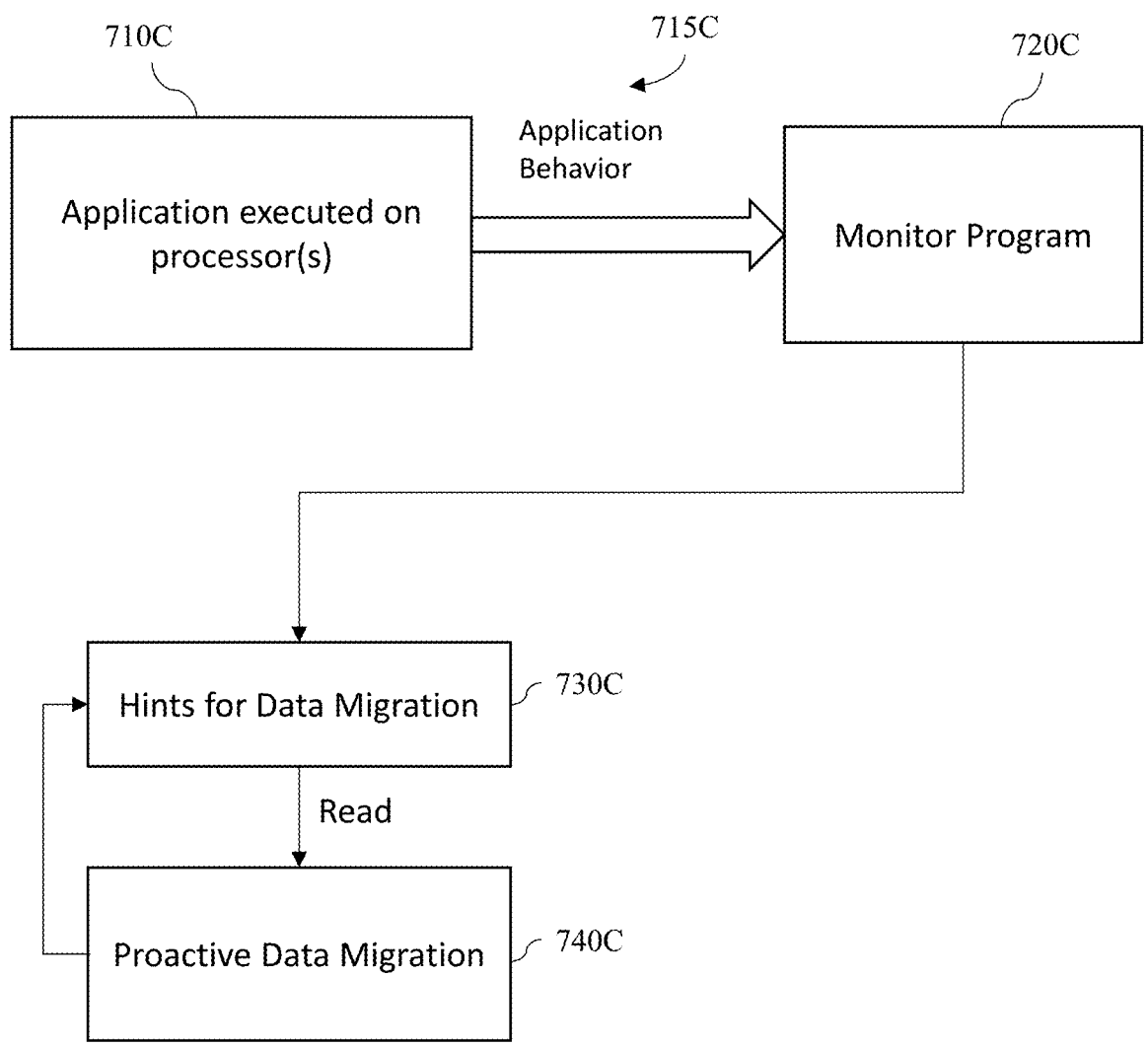

FIGS. 7A-7C are flow diagrams illustrating some exemplary processes for managing data in DRAMs in accordance with examples set forth in the disclosure. In FIG. 7A, a user-level application code (710A) includes one or more hints indicating future processor usage (e.g., processor utilization, processor use priority, etc.). In one variation, the hints are written by an application developer to the application code. The user-level application code (710A) writes one or more hints to the register (e.g., MSR) (720A), for example, when the user-level application code is loaded onto a processor. A memory allocation logic reads the one or more hints from the register and proactively conducts data migration (730A), using any one of the implementation described herein.

In the example illustrated in FIG. 7B, a user-level application code (710B) is generated. A compiler (715B) compiles the user-level application to generate the compiled code (720B). In some implementations, the compiler (715B) inserts one or more hints into the compiled code. In some variations, the compiler (715B) analyzes the user-level application code (710B) to generate one or more hints indicative of processor usage when certain code sections in the user-level application code to be executed. The compiled code (720B) writes one or more hints to the register (e.g., MSR) (730B), for example, when the compiled code is loaded onto a processor. A memory allocation logic reads the one or more hints from the register and proactively conducts data migration (740B), using any one of the implementations described herein.

In the example illustrated in FIG. 7C, an application is executed on a processor(s) (710C). A monitor program (720C) monitors application behavior (715C) when the application is being executed by the processor(s). The application behavior includes, for example, last level cache misses, CPU/GPU frequency, temperature, power, and/or the like. Based on the monitored application behavior (715C) writes one or more hints to the register (e.g., MSR) (730C), for example, when the compiled code is loaded onto a processor. A memory allocation logic reads the one or more hints from the register and proactively conducts data migration (740C), using any one of the implementations described herein.

In some implementations, the monitor program (720C) uses machine learning model to predict processor usage based upon historical data on processor usage and the monitored application behavior. In one example, the monitor program uses a linear regression algorithm to predict future processor usage. In one instance, the monitor program uses a non-linear regression algorithm to predict future processor usage. In some implementations, the machine learning model includes any suitable machine learning models, deep learning models, and/or the like. In some instances, the machine learning model includes at least one of a decision tree, random forest, support vector machine, convolutional neural network, recurrent neural network, and/or the like. In some instances, the future processor usage is determined based on parameters that can be measured such as, for example, processor frequency, power usage, last level cache misses, and/or the like.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for managing data in one or more memories, comprising:
   receiving a hint related to future processor usage by a software component, the hint received prior to an execution of the at least part of the software component, the future processor usage indicative of future heat generated by one or more processors when executing at least part of the software component, the one or more processors being disposed in a stacked relation to the one or more memories;
   selecting a memory location in the one or more memories for data used by the software component based on the hint, prior to the execution of the at least part of the software component, wherein the selected memory location is predicted to be at a lower temperature than other memory locations of the one or more memories; and
   allocating memory for the data used by the software component at the selected memory location in the one or more memories.

2. The method of claim 1, further comprising:
   generating a thermal gradient prediction for the one or more memories based at least in part on the hint, wherein selecting the memory location comprises selecting the memory location based on the thermal gradient prediction for the one or more memories.

3. The method of claim 2, further comprising:
   receiving temperature data associated with the one or more memories, the temperature data collected by a plurality of temperature sensors; and
   generating the thermal gradient prediction for the one or more memories based at least in part on the hint and the received temperature data.

4. The method of claim 1, wherein allocating the memory for the data used by the software component at the selected memory location comprises migrating the data used by the software component from a first memory location in the one or more memories to the selected memory location in the one or more memories prior to the execution of the at least part of the software component, wherein the selected memory location is predicted to be at a lower temperature than the first memory location of the one or more memories.

5. The method of claim 1, wherein the software component comprises an application that includes executable code that comprises the hint and is configured to write the hint to a register.

6. The method of claim 1, wherein receiving the hint comprises receiving the hint from a register, wherein the hint is generated based upon an analysis of the software component.

7. The method of claim 1, further comprising:
   migrating the data used by the software component from a first memory location in the one or more memories to a second memory location in the one or more memories based on temperature information of the one or more memories collected during execution of the software component.

8. The method of claim 1, wherein the hint comprises a hint indicative of a processor priority of the at least part of the software component.

9. The method of claim 1, wherein the hint comprises a hint indicative of a first processor of the one or more processors executing the software component concurrently with a second processor of the one or more processors executing the software component.

10. An apparatus comprising:
    one or more processors disposed in a stacked relation to one or more memories; and
    a controller coupled to the one or more processors and configured to:
    receive a hint related to future processor usage by a software component, the hint received prior to an execution of the at least part of the software component, the future processor usage indicative of future heat generated by the one or more processors when executing at least part of the software component;
    select a memory location in the one or more memories for data used by the software component based on the hint, prior to the execution of the at least part of the software component, wherein the selected memory location is predicted to be at a lower temperature than other memory locations of the one or more memories; and
    allocate memory for the data used by the software component at the selected memory location in the one or more memories.

11. The apparatus of claim 10, wherein the controller is further configured to:
    generate a thermal gradient prediction for the one or more memories based at least in part on the hint; and select the memory location based on the thermal gradient prediction for the one or more memories.

12. The apparatus of claim 11, wherein the controller is further configured to:
   receive temperature data associated with the one or more memories, the temperature data collected by a plurality of temperature sensors; and
   generate the thermal gradient prediction for the one or more memories based at least in part on the hint and the received temperature data.

13. The apparatus of claim 10, wherein the controller is further configured to:
   migrate the data used by the software component from a first memory location in the one or more memories to the selected memory location in the one or more memories prior to the execution of the at least part of the software component,
   wherein the selected memory location is predicted to be at a lower temperature than the first memory location of the one or more memories.

14. The apparatus of claim 10, wherein the software component comprises an application that includes executable code that comprises the hint and is configured to write the hint to a register.

15. The apparatus of claim 10, wherein the controller is further configured to:
   receive the hint from a register,
   wherein the hint is generated based upon an analysis of the software component.

16. The apparatus of claim 10, wherein the controller is further configured to:
   migrate the data used by the software component from a first memory location in the one or more memories to a second memory location in the one or more memories based on temperature information of the one or more memories collected during execution of the software component.

17. The apparatus of claim 10, wherein the hint comprises a hint indicative of a processor priority of the at least part of the software component.

18. A multi-chip device comprising:
   a first die comprising one or more processors;
   a stack of memory dies disposed in a three dimensional relation with the first die; and
   a controller coupled to the one or more processors and to the stack of memory dies, wherein the controller is configured to:
   receive a hint related to future processor usage by a software component, the hint received prior to an execution of the at least part of the software component, the future processor usage indicative of future heat generated by the one or more processors when executing at least part of the software component;
   receive temperature data associated with the stack of memory dies in the three dimensional relation with the first die, the temperature data collected by a plurality of temperature sensors;
   generate a thermal gradient prediction for the stack of memory dies based at least in part on the hint and the received temperature data;
   select one or more memory locations in the stack of memory dies for data used by the software component prior to the execution of the at least part of the software component based on the thermal gradient prediction for the stack of memory dies; and
   allocate memory for the data used by the software component at the selected one or more memory locations in the stack of memory dies,
   wherein the selected one or more memory locations are predicted to be at a lower temperature than other memory locations of the stack of memory dies.

* * * * *